Oct. 31, 1961  G. H. HADDEN ET AL  3,006,229
ELECTRONIC ORGAN
Filed April 22, 1959  3 Sheets-Sheet 1

INVENTORS
GEORGE H. HADDEN
RICHARD H. CAMPBELL JR

ATTORNEYS

INVENTORS
GEORGE H. HADDEN
RICHARD H. CAMPBELL JR.

BY Porter, Chittick & Russell
ATTORNEYS

INVENTORS
GEORGE H. HADDEN
RICHARD H. CAMPBELL JR.

ATTORNEYS

United States Patent Office 3,006,229
Patented Oct. 31, 1961

3,006,229
ELECTRONIC ORGAN
George H. Hadden and Richard H. Campbell, Jr., Laconia, N.H., assignors to Kinsman Manufacturing Co., Inc., Laconia, N.H., a corporation of New Hampshire
Filed Apr. 22, 1959, Ser. No. 808,098
2 Claims. (Cl. 84—1.24)

This invention relates to electronic organs and more particularly to an electronic organ adapted selectively to provide percussion and reverberation effects.

The term "percussion effect" denotes the relatively slow dying away (i.e., progressive decrease in amplitude) of a note and is used herein to distinguish from an abrupt checking or termination of a note. The term "reverberation effect" is used herein to denote an effect similar to the resounding or continuation of a note at a reduced amplitude, like an echo or series of echoes.

The primary object of this invention is to provide an electronic organ having selectively useable means for modifying the musical notes produced by the playing of the keys of a keyboard so as to produce either a percussion effect or a reverberation effect.

A more particular object of this invention is to provide an electonic organ having a predetermined number of generators for producing a plurality of electrical signals of the frequencies of the musical scale, a like plurality of amplifiers for amplifying said electrical signals each amplifier comprising a triode, means coupling said electrical signals to the grids of said triodes, means connected to said grids normally biasing said triodes below cutoff, a like plurality of normally open switches, one for each amplifier, said switches connected between the grids of said triodes and a common terminal having a D.C. potential above cutoff, selectively operated means for closing individual ones of said switches, whereby to render operative the triode associated with each individual switch, and means for varying the time for restoring the bias on said triodes to cutoff after said individual switches have been reopened.

Other objects and many of the attendant advantages of this invention will be more readily appreciated as the invention becomes better understood by reference to the following detailed description when considered in connection with the accompanying drawings, wherein.

Figure 1:
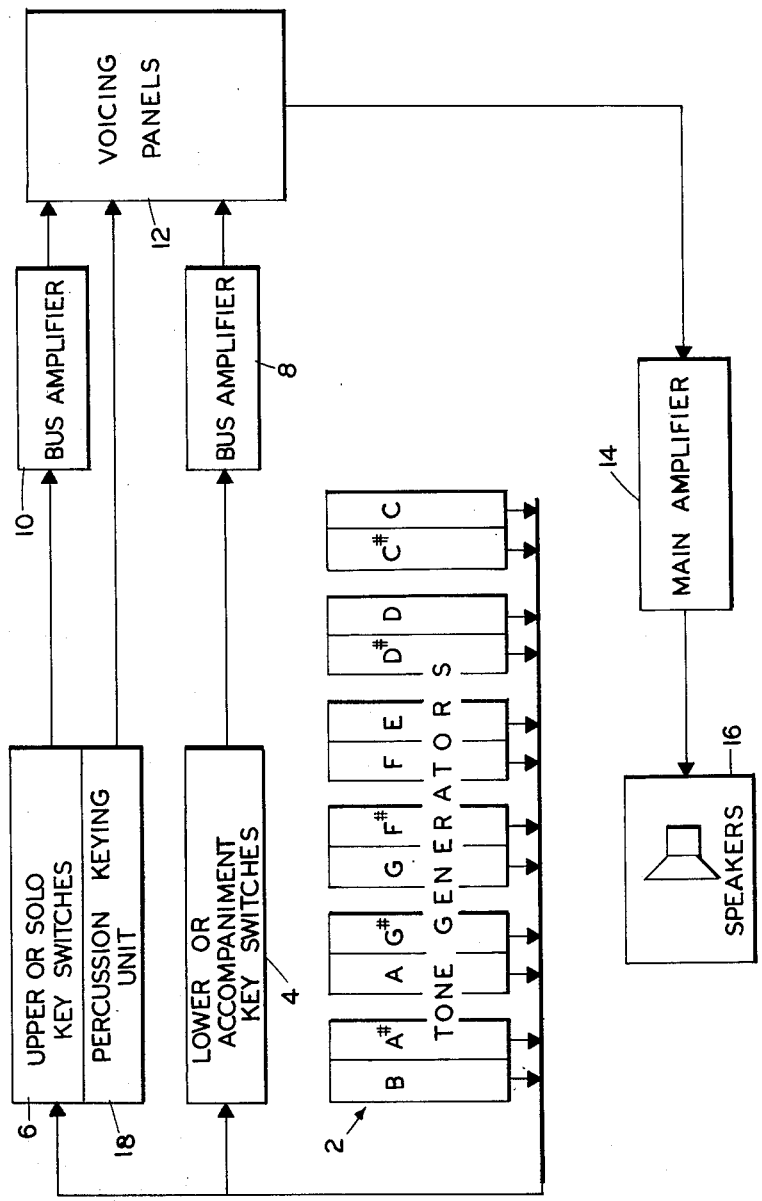
FIG. 1 is a schematic representation of the electrical system of an organ embodying the present invention.

Referring now to FIG. 1, which is a schematic wiring and block diagram of a musical instrument incorporating the invention, the instrument includes twelve tone generators 2, each adapted to produce oscillating electrical signals corresponding to different notes of the chromatic scale. The outputs of these generators are connected to separate switches in each of two separate banks 4 and 6. The switches in banks 4 and 6 are operated by individual keys in separate lower and upper manuals or keyboards respectively. The switches in banks 4 and 6 operate when closed to couple the outputs of the tone generators to bus amplifiers 8 and 10 which amplify these outputs and couple them to a voicing panel 12. The latter is essentially a tone timbre system which includes a plurality of filters, some of which are partially interlocked, for modifying the wave shape of the amplifier output so as to get a variety of tone colors (i.e., voices) which can be called upon at will by the player of the instrument. The outputs of the voicing panel are applied to a main amplifier 14 which in turn drives a loudspeaker system 16. Still referring to FIG. 1, the system also includes a percussion keying unit 18 which consists of a series of separate amplifiers each tied to and controlled by separate switches in the upper bank 6. If desired, the percussion keying unit could be associated with the lower manual of the organ, in which case, its separate amplifiers would be tied to and controlled by separate switches in the lower bank 4. The function of the percussion unit is to cause a note to linger for a short while after the key which was struck to produce that note has been released. The output of this unit is applied directly to the voicing panel for modification to a desired tone color.

Figure 2:
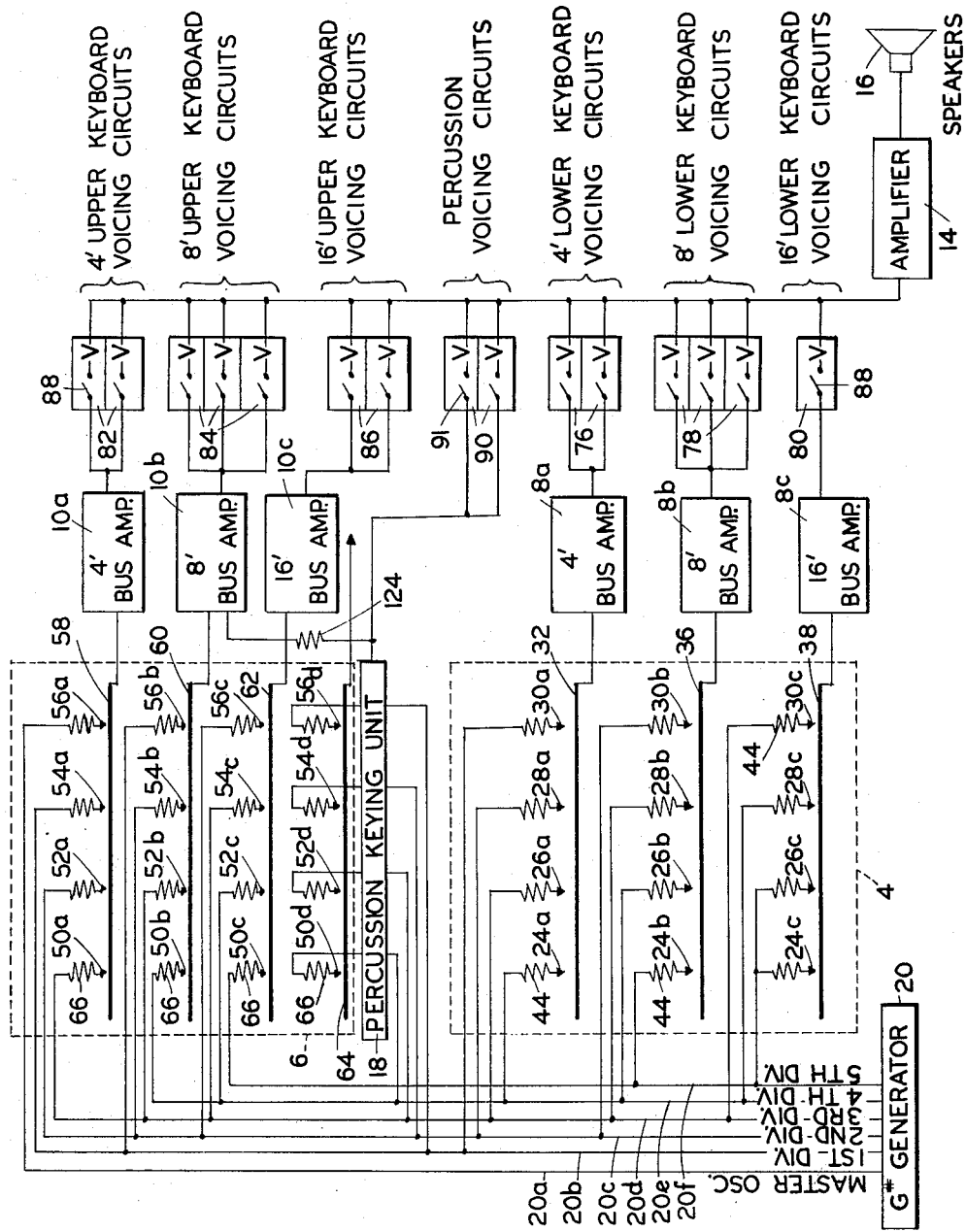
FIG. 2 is a more detailed representation of the same system from the standpoint of a single tone generator.

FIG. 2 provides a more detailed picture of an organ system embodying the present invention. For convenience of illustration and description, we have elected to show only a single generator 20. This generator produces a master oscillating output 20a having the frequency of a G# note in a high octave register and a series of additional oscillating outputs 20b, 20c, 20d, 20e, and 20f at lower frequencies having lower octave relationships to output 20a. These outputs are connected to key switches in the lower and upper banks 4 and 6 respectively. For convenience of illustration and because a single tone generator is illustrated, only four sets of key switches are shown in the lower and upper banks respectively. However, it is to be understood that in practice each manual comprises a relatively large number of keys and each key will have associated therewith its own set of key switches. Thus, in an organ having two manuals of 44 keys each, each manual will have 44 sets of key switches, and the several outputs of the twelve tone generators will be connected to the key switches in such a manner that the physical order of the keys will correspond to the order of successive notes and octaves of the chromatic scale.

As seen in FIG. 2, the key switches in the lower bank are arranged in sets of three. Each switch comprises a movable contact which is moved by the pressing of a key into contact with a bus bar. Contacts common to the same key are designated by a common number followed by a letter. Thus, contacts 24a, b, and c are all common to a single key, and contacts 26a, 26b, and 26c are all operated by another key. The same is true of contacts 28a, b, and c and contacts 30a, b, and c. The key which operates contacts 24a, b, and c simultaneously has a position on the keyboard one octave lower than the key which operates contacts 26a, b, and c. Similarly, the keys which operate contacts 28a, b, and c and contacts 30a, b, and c have positions on the keyboard which are one and two octaves higher respectively than the key which operates contacts 26a, b, and c. Contacts 24a, 26a, 28a, and 30a close on a common bus bar 32 which is connected to the input terminal of a 4-foot bus amplifier 8a. The other two levels of switches close on bus bars 36 and 38 which are connected to 8-foot and 16-foot bus amplifiers 8b and 8c respectively.

The outputs of tone generator 20 are connected to the switch contacts through isolating resistors 44 of appropriate value. In a typical embodiment of the invention having keyboards of 44 keys each, these resistors will vary from 47 kilohms for the highest notes to 560K for the lowest notes. The exact connections are shown in FIG. 2 and need not be described in detail. With the exception of contacts 24b and 24c, the contacts in each set are connected in the order in which they are enumerated to successively lower frequency outputs of the tone generator. The system of connections is such that 8-foot notes are produced when contacts 24b, 26b, etc., are closed; 4-foot notes are produced when contacts 24a, 26a, etc., are closed; and 16-foot notes are produced when the third level of contacts are closed. In organ parlance, an 8-foot note is produced when the pitch obtained from a given key is the same as that obtained from the physically corresponding key on a piano. A 4-foot tone produced by the same key is an octave higher, and a 16-foot tone is an octave lower. It is to be noted that contacts 24b and 24c are both connected to the same output. Hence, when the 16-foot contact 24c is closed, it will produce the same low note as 8-foot contact 24b. Since 16-foot contact 26c is also connected to the same output, it will also produce the same note as contacts 24b and 24c. These are limitations which may be eliminated by using a generator capable of providing a seventh output one octave lower than output 20f. However, these limitations are not oppressive since an additional lower octave would be used but seldom, and the benefits to be derived thereby would not justify a more complex generator.

The key switches in the upper bank are ganged in sets of four. As in the lower bank, each switch comprises a movable contact which is moved by the pressing of a key into contact with a bus bar. Contacts 50a, 52a, 54a, and 56a close on a bus bar 58; contacts 50b, 52b, etc., close on a bus bar 60; contacts 50c, 52c, etc., close on a bus bar 62; and contacts 50d, 52d, etc., close on a bus bar 64. In practice, the two keyboards are physically offset by one octave set of keys. Because of this physical displacement of the keyboards, the 4-foot connections in the lower keyboard are the same as the 8-foot connections in the upper keyboard. Thus, contacts 50b, 52b, 54b, and 56b are connected to the same outputs as contacts 24a, 26a, 28a, and 30a respectively. The fourth set of contacts 50d, 52d, 54d, and 56d are connected to different stages of the percussion keying unit 18 which are supplied with the same generator outputs as the 8-foot contacts 50b, 52b, 54b, and 56b. The connections just described for the top three levels of contacts in the upper bank are made by way of isolating resistors 66 of appropriate value. Bus bars 58, 60, and 62 are connected to 4-foot, 8-foot, and 16-foot bus amplifiers 10a, 10b, and 10c respectively. Bus bar 64 is connected to an operating bias voltage source for the individual circuits of the percussion keying unit.

The outputs of the six bus amplifiers 8a, 8b, 8c, 10a, 10b and 10c are fed to appropriate voicing circuits 76, 78, 80, 82, 84, and 86 respectively in voicing panel 12. The number of voicing circuits for each bus amplifier may be varied, dependent upon the number of different tone colors desired to be made available. In practice, as many as 19 different tone colors or timbres, ranging from sharp strings and reeds to bland flutes and pipelike diapasons, have been made available by using a plurality of filters singly and in combination. Accordingly, the number of voicing circuits may be varied as desired. Each voicing or filter circuit includes a tab switch 88, preferably on the input side of the circuit, which is operated by the player. So long as the switch is open, the circuit produces no output. When the switch is closed, the circuit will modify the input thereto from the bus amplifier according to the spectrum of the voice which it is designed to reproduce as, for example, a trumpet. The output from each voicing circuit is then amplified and fed to the speaker system.

The output of percussion keying unit 18 is coupled to separate percussion voicing circuits 90 which are cut into the system by tab switches 91. The number of percussion voicing circuits may be varied, and, if desired, the output of the percussion keying unit may be fed to some of the main voicing circuits 76–86, either directly or by way of one of the bus amplifiers.

Figure 3:
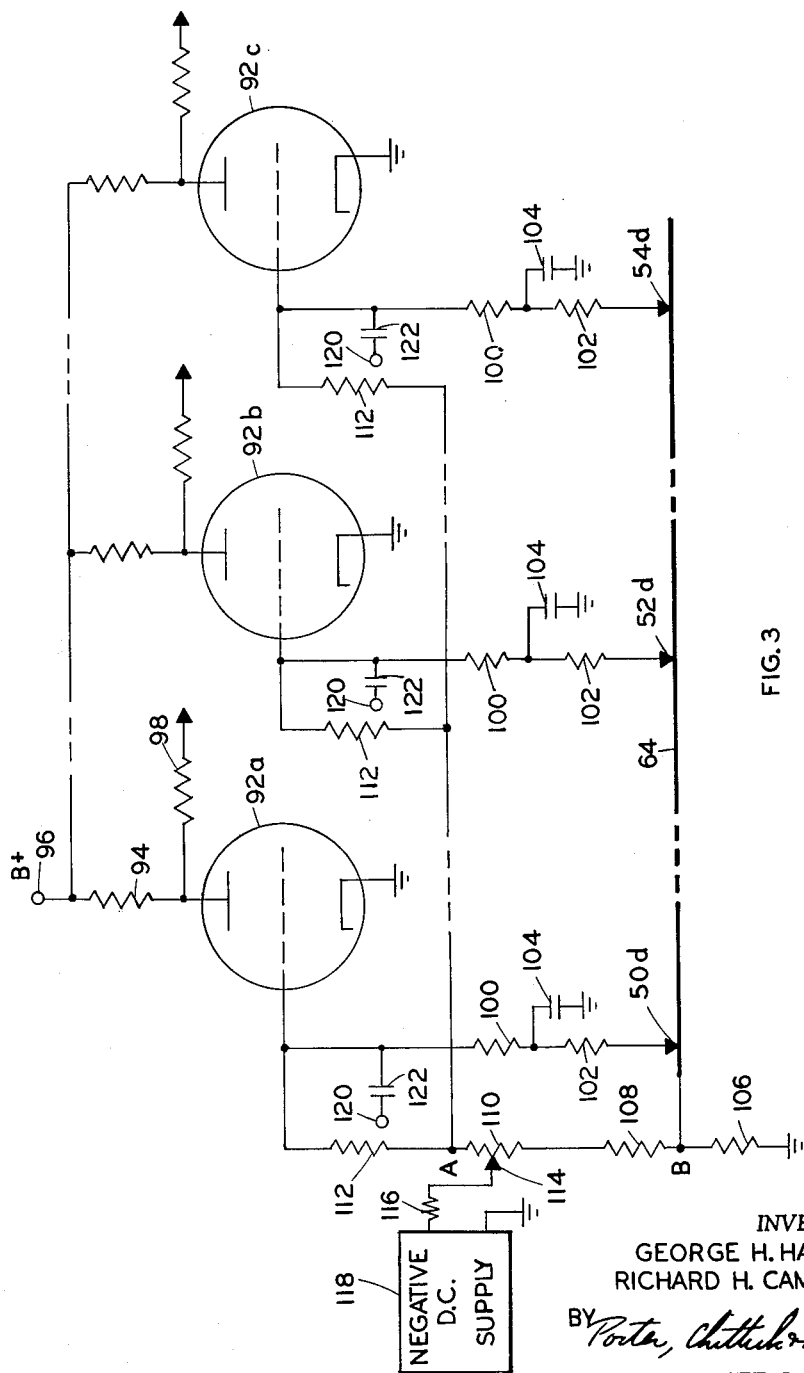
FIG. 3 is a circuit diagram illustrating a portion of the percussion keying circuit.

Turning now to FIG. 3, we have elected to show only three of the keying circuits incorporated in the percussion keying unit 18. However, it is to be understood that the number of keying circuits is exactly equal to the number of keys in the upper manual. FIGURE 3 shows the keying circuits for contacts 50d, 52d, and 54d. These keying circuits are identical and comprise a suitable vacuum triod 92 (in this case, a type 12AX7). The plate of each tube is connected by a 220 kilohm resistor 94 to a positive 250 volt D.C. source 96. The cathode of each tube is connected to ground. The output is taken between the plate and ground through a 470 kilohm resistor 98 and is coupled directly to the percussion voicing circuits 90. The grid of each tube is connected by a 1 megohm resistor 100 and a 100 kilohm resistor 102 to a key-switch contact (50d, 52d, and 54d) which normally is in open relation with bus bar 64. A .1 microfarad capacitor 104 is connected between ground and the juncture of resistors 100 and 102. Bus bar 64 is connected to the juncture point B in FIG. 3) of two resistors 106 and 108 which are connected in series between ground and one end of a potentiometer 110. The grids of the tubes are connected to the other end of potentiometer 110 through identical resistors 112. Resistor 106 has a value of 680 ohms. Resistor 108 has a value of 2200 ohms. Potentiometer 110 has a value of 25 kilohms. Resistors 112 have a value of 15 megohms. The slider 114 of potentiometer 110 is connected by a 10 kilohm resistor 116 to a negative D.C. voltage supply 118 having a voltage of −35 volts. The input to each keying unit is the appropriate 8-foot signal for the key with which the keying unit is associated. In this case, the input to tube 92a is generator output 20e. The input for tubes 92b and 92c are generator outputs 20d and 20c respectively. These signals are applied at terminals 120 which are connected by .01 microfarad capacitors 122 to the grids of the tubes.

Basically, each keying unit is a non-linear amplifier. As such, the incoming waveform may be considerably distorted; but since only one frequency, with its harmonics, is present, the distortion only generates musically consonant harmonics comparable to those already present. Such distortion is entirely permissible and makes possible a means of output level control which would be entirely unuseable with a complex signal. Control is obtained not so much by varying the amplification of the tube as by varying the position of the incoming wave which gets amplified. In fact, the circuit would work satisfactorily with an ideal tube having absolutely linear characteristics except for a sharp discontinuity at cutoff.

The peak-to-peak voltage of the incoming 8-foot signal is of the same order as the cutoff voltage of the tube. Normally, the grid is biased sufficiently negative to keep it completely cut off. When a key switch contact, e.g., 50d, is closed by pressing down on a key, it essentially grounds out the bias on the tube and allows it to amplify. Closing the key switch permits capacitor 104 to discharge through resistors 102 and 106. The time required for this discharge is short enough, e.g., approximately .02 second, to be negligible. The tube will continue to amplify, an the output will remain steady so long as the switch contact is held closed by the key. When the key is released, the switch contact reopens and capacitor 104 starts charging again through resistors 112 and 100 toward a bias voltage determined by the position of slider 114. The bias voltage does not return instantaneously to cutoff but is delayed by the time constant of resistors 112 and 100 and capacitor 104. Thus, the output of the tube dies away slowly after the key is released. The decay time for the outputs of the several keying circuits is continuously variable over a relatively wide range by means of slider 114 which, since it varies the bias voltage at the lower end of resistor 112 (point A in FIG. 3), determines the time required for the grid voltage to reach cutoff after a key is released. In other words, the time required to reach full cutoff depends on the R-C time constant (which is fixed) and the voltage at point A (which is variable). Full cutoff is reached when the negative D.C. grid voltage becomes equal to the sum of the tube cutoff voltage and the peak voltage of the 8-foot audio signal input.

For no setting of the slider should the signal peaks rise to the point where they will cause grid conduction (in this case, zero volts), and, conversely, for no setting should very much of the incoming signal lie below cut-off. The reason for the latter limitation is to avoid considerable loss of volume. The reason for the former limitation is made clear by considering the case when two notes are played at once. Signals from both notes are present on the 8-foot key-switch bus bar 60 in the directly keyed section of the organ. A signal from one of these notes will feed backward through the key switch and resistor associated with the other note, into the tone generator output of the other note, and thence to the percussion keying unit input. It will be heavily attenuated but will be present. Therefore, the input to one of the percussion keying circuits will contain not only the desired signal but also, very weakly, a signal from any other note played at the same time. This undesired signal is so weak that ordinarily the generated cross products will be completely unnoticeable even though the keying circuit is non-linear. However, if grid conduction is allowed to take place, the tube will act as a grid leak detector for the difference frequency between the two notes. If the two notes played are close together on the keyboard, this difference tone may be loud and objectionable.

These limitations not only leave a rather narrow range of acceptable grid voltages but also make it desirable that the grid voltage, while the key is held, should be independent of the position of slider 114 on potentiometer 110. The grid voltage is given by tthe expression:

$$V_G = V_B + \tfrac{1}{16}(V_A - V_B)$$

or $$V_G = \tfrac{15}{16}V_B + \tfrac{1}{16}V_A$$

where $V_G$ is the grid voltage and $V_A$ and $V_B$ are the voltages at points A and B in FIG. 3. Therefore, if the circuit can be so designed that any change in voltage at A produced by a change in slider position is accompanied by a change in voltage at B in the opposite direction and $\tfrac{1}{15}$ as great, the grid voltage will be substantially independent of slider position. The circuit of FIG. 3 approximates that condition. If the slider is moved so as to produce an increase in the negative voltage at point A, a proportionate but much smaller decrease is produced in the negative voltage at point B. Because of the manner in which the grid of each keying tube, while the key is held, is connected to both points A and B, the two effects cancel out, leaving the actual grid bias substantially unchanged.

The percussion system not only allows the decay time for the percussion notes to be continuously variable over a wide range by means of the manually controlled slider 114 of potentiometer 110, but it allows or makes possible a reverberation effect. This is accomplished in a simple manner, as illustrated in FIG. 2.

The unfiltered signal output from percussion unit 18 is applied through an amplitude reducing resistor 124 to the upper manual 8-foot bus amplifier 10b. Thus, a small amount of sustained signal is incorporated in all the regular 8-foot voices on the upper keyobard, even when none of the percussion voices are used. Since the normal 8-foot voices stop abruptly when the keys are released, the presence of the sustained signal of lower amplitude produces an effect very much like natural reverberation when the decay control slider 114 is set for medium or long decay. The effect can be essentially shut off by turning the decay control slider to the minimum setting.

Obviously, many modifications and variations of this invention are possible in the light of the above teachings. It is to be understood, therefore, that the invention is not limited in its application to the details of construction and arrangement of parts specifically described or illustrated, and that within the scope of the appended claims, it may be practiced otherwise than as specifically described or illustrated.

We claim:
1. In an electronic musical instrument a plurality of tone generators, amplifier means, an output means driven by said amplifier means, a plurality of switches selectively connecting said tone generators to the input of said amplifier means, percussion keying means connected for ganged operation with said switches, attenuation means interconnecting said percussion keying means and the input of said amplifier, and means selectively connecting said percussion keying means directly to said output means.

2. Apparatus according to claim 1 in which said percussion keying means includes a set of percussion switches having a percussion switch corresponding respectively to each of said plurality of switches, ganged operating connections between said plurality of switches and said set of percussion switches respectively, percussion amplifiers for each of said percussion switches and normally biased to cut-off for the unoperated condition of said percussion switches, a circuit completed for the operated position of said percussion switches for removing the cut-off bias on said percussion amplifiers, and a time constant circuit operable to gradually restore said cut-off bias upon releasing an operated percussion switch.

References Cited in the file of this patent
UNITED STATES PATENTS

| | | |
|---|---|---|
| 2,173,888 | Smiley | Sept. 26, 1939 |
| 2,310,429 | Hanert | Feb. 9, 1943 |
| 2,357,191 | Hanert | Aug. 29, 1944 |
| 2,500,820 | Hanert | Mar. 14, 1950 |
| 2,533,821 | Langer | Dec. 12, 1950 |
| 2,557,133 | Mork | June 19, 1951 |